US006301814B1

(12) United States Patent
Baxter

(10) Patent No.: US 6,301,814 B1
(45) Date of Patent: Oct. 16, 2001

(54) DISPLAY FOR A FLEXIBLE HEAD TOOTHBRUSH

(75) Inventor: Thomas Baxter, Gibsonia, PA (US)

(73) Assignee: SmithKline Beecham Corporation, Philadelphia, PA (US)

( * ) Notice: Subject to any disclaimer, the term of this patent is extended or adjusted under 35 U.S.C. 154(b) by 0 days.

(21) Appl. No.: 09/371,846

(22) Filed: Aug. 11, 1999

(51) Int. Cl.[7] .................................................... G09B 23/28
(52) U.S. Cl. ................................................ 40/429; 40/423
(58) Field of Search ............................. 40/421, 423, 426, 40/429, 538; 15/167.1, 22.2

(56) References Cited

U.S. PATENT DOCUMENTS

| | | | | |
|---|---|---|---|---|
| D. 335,579 | | 5/1993 | Chuang | D4/105 |
| 1,239,033 | * | 9/1917 | Norwood | 40/423 |
| 2,926,487 | * | 3/1960 | Stone | 40/423 |
| 5,651,158 | | 7/1997 | Halm | 15/167.1 |
| 5,758,383 | | 6/1998 | Hohlbein | 15/167.1 |
| 5,836,030 | * | 11/1989 | Hazeu et al. | 15/22.1 |
| 5,946,758 | | 9/1999 | Hohlbein et al. | 15/167.1 |
| 5,989,036 | * | 11/1999 | Schwartz | 434/263 |
| 6,073,299 | | 6/2000 | Hohlbein | 15/167.1 |

FOREIGN PATENT DOCUMENTS

| | | | | |
|---|---|---|---|---|
| 0 454 625 A1 | | 10/1991 | (EP) . | |
| 1199863 | * | 12/1959 | (FR) | 40/421 |
| WO 97/07707 | | 3/1997 | (WO) . | |

* cited by examiner

*Primary Examiner*—Cassandra H. Davis
(74) *Attorney, Agent, or Firm*—Nora Stein-Fernandez; Stephen A. Venetianer; Charles M. Kinzig

(57) ABSTRACT

A display for a flexible head toothbrush includes a first representation of a first bristled portion of a toothbrush head and a second representation of a second bristled portion of a toothbrush head. The first representation is interconnected with the second representation by a mechanical linkage. The mechanical linkage provides oscillatory pivotal movement of the second representation with respect to the first representation. The mechanical linkage is preferably an electromagnet motor, such as a self-starting swinging apparatus, powered by a solar cell. The second representation preferably depicts a tip end of the toothbrush head, while the first representation depicts a remaining portion of the toothbrush head. The display may also include a third representation of at least a portion of a toothbrush handle extending from the first representation. Further, the display may include a support having shelves that hold actual toothbrushes.

20 Claims, 3 Drawing Sheets

DISPLAY FOR A FLEXIBLE HEAD TOOTHBRUSH

BACKGROUND OF THE INVENTION

1. Field of Invention

The invention relates to a display for a flexible head toothbrush. The display is especially useful in advertising toothbrushes in such a maimer as to attract and inform consumers of how the toothbrush functions in use.

2. Description of Related Art

Recently, flexible head toothbrushes have come on the market. One such toothbrush is sold under the trade name "Aquafresh Flex Tip," sold by SmithKline Beecham. A distinguishing feature of such toothbrush is that the bristled head is segmented by a flexible and resilient hinge. The hinge permits the tip of the toothbrush head to flex during use, thereby following the contours of a user's teeth.

The retail market for toothbrushes is very competitive, and often, the differences between competing products are not easily ascertainable by consumers. Further, consumers tend to purchase toothbrushes impulsively at the point of sale, rather than researching competing products and comparing their features. Thus, the window of opportunity for a toothbrush manufacturer to attract consumers and persuade them to purchase a product is narrow. These factors make it difficult for manufacturers to describe differences and convey advantages of a particular toothbrush over competing products.

This difficulty is somewhat compounded with flexible head toothbrushes since the consumer may not readily appreciate how the brush functions by merely viewing the product in its package. Thus, while many toothbrush manufacturers use motionless displays to advertise their products at the point of sale, such a display would have limited benefit in highlighting the distinguishing features of a flexible head toothbrush and conveying to the consumer how the product works. In addition, while motionless toothbrush displays may be somewhat informative, they are not particularly effective in catching the attention of consumers during the short window of opportunity for impulse purchases.

In contrast, the present invention is effective in catching the attention of purchasers, demonstrating how the product works, identifying a point of distinction with competing products, and conveying advantages of the product.

SUMMARY OF THE INVENTION

The invention provides a display for a flexible head toothbrush including a first representation of a first bristled portion of a toothbrush head, a second representation of a second bristled portion of the toothbrush head, and a mechanical linkage that interconnects the first representation with the second representation. The mechanical linkage imparts relative motion between the two portions of the toothbrush head to simulate a flexing motion. Preferably, the relative motion is pivotal and oscillatory.

In a preferred embodiment, the second representation depicts a tip end of the toothbrush head, and the first representation depicts at least a portion of a remainder of the toothbrush head. Further, the mechanical linkage preferably includes a motor capable of imparting relative motion between the second representation and first representation. The mechanical linkage may include an electromagnet motor powered by a solar cell.

In the preferred embodiment, the display also includes a third representation of at least a portion of a toothbrush handle. The third representation extends from the first representation in a direction away from the second representation. The third representation may depict a straight toothbrush handle, a curved toothbrush handle, a flexible toothbrush handle, or the like.

Additionally, in the preferred embodiment, at least one of the first representation, second representation, third representation, and mechanical linkage are mounted on a support. The support may be a holder for at least one actual toothbrush. Preferably, the support includes at least one shelf that holds at least one actual toothbrush.

The invention effectively catches the attention of consumers by providing a motion display for a bristled toothbrush head. Relative motion between the first representation of the first bristled portion of the toothbrush head and the second representation of the second bristled portion of the toothbrush head simulates how the product actually works in use. The relative motion imparted by the invention also identifies a point of distinction with competing products, conveys advantages of the product, and catches consumer attention.

These and other features and advantages will be described in or are apparent from the following detailed description of the preferred embodiments.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Reference will now be made to present preferred embodiments of the invention, examples of which are illustrated in the accompanying drawings.

Figure 1:
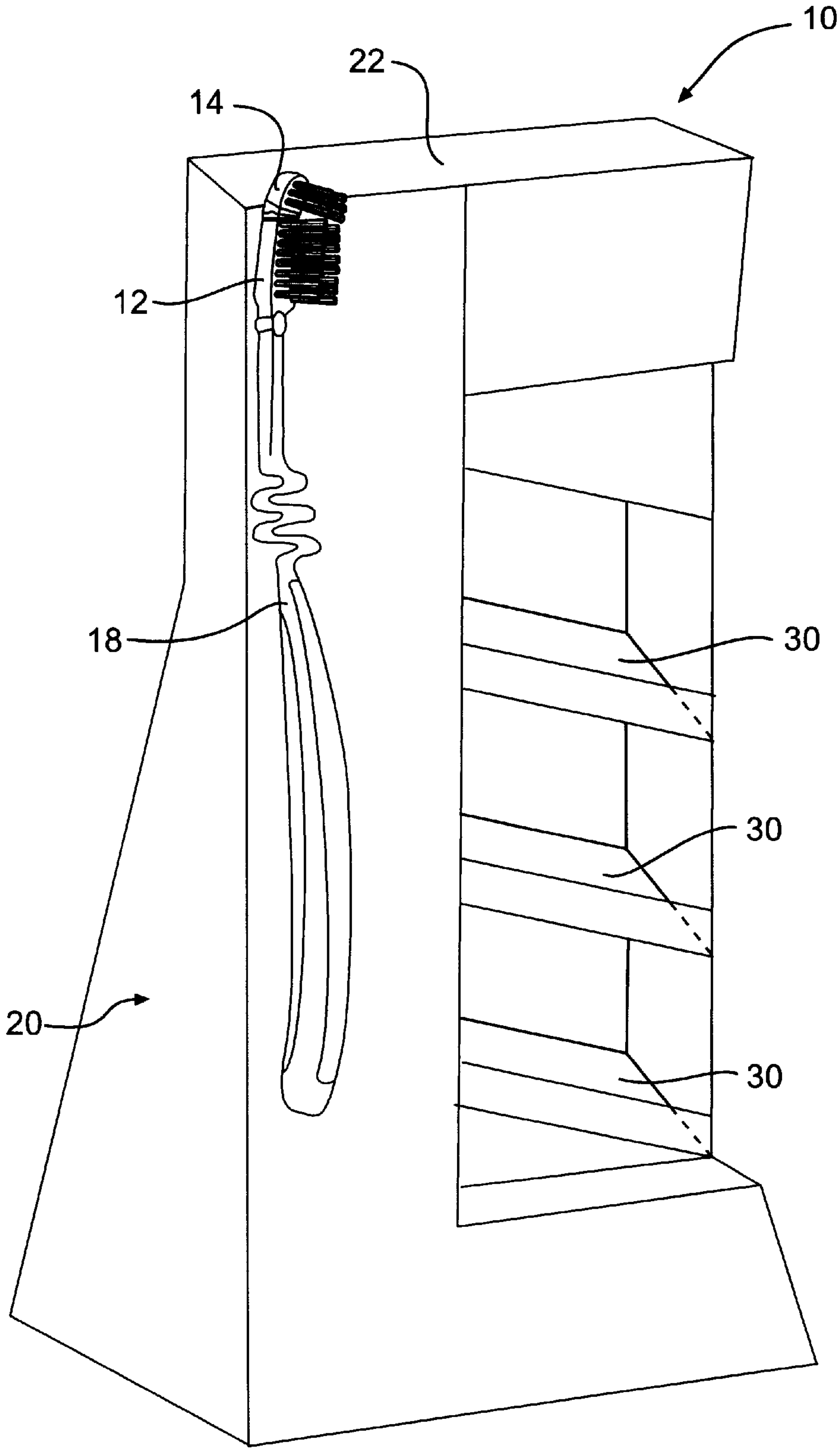
FIG. 1 is a perspective view of a preferred embodiment of a display for a flexible head toothbrush according to the invention.
Figure 2:
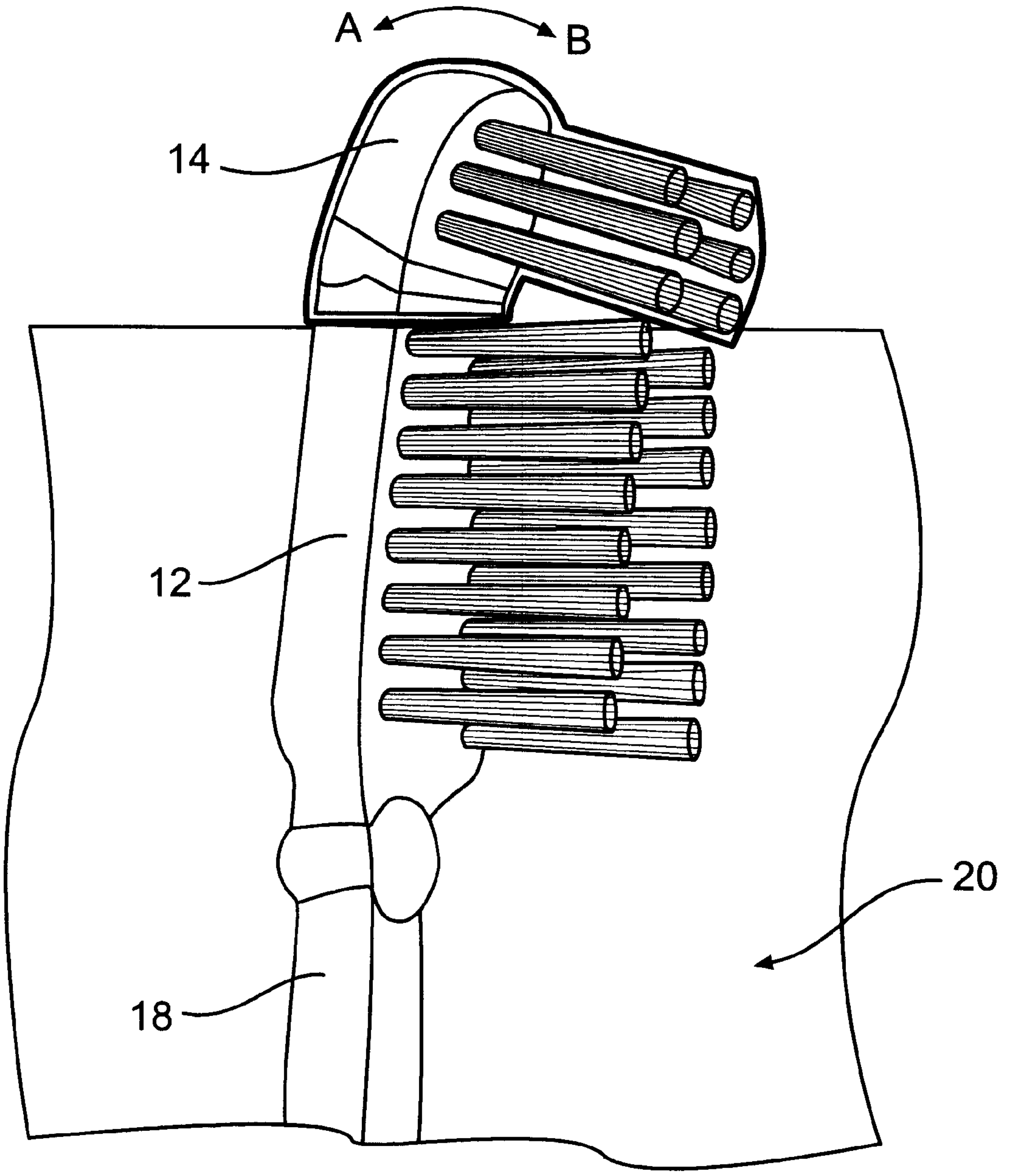
FIG. 2 is a partial view of the display illustrated in FIG. 1.

In accordance with the present invention, there is provided a display 10 for a flexible head toothbrush. As illustrated in FIGS. 1 and 2, the display 10 is useful in advertising toothbrushes in such a manner as to attract consumers. The display 10 includes a first representation 12 of a first bristled portion of a toothbrush head interconnected with a second representation 14 of a second bristled portion of the toothbrush head.

Preferably, the second representation 14 depicts a tip end of the toothbrush head, while the first representation 12 depicts at least a portion of a remainder of a toothbrush head. The first and second representations 12, 14 can be constructed from any structural material that will maintain its form, such as cardboard, plastic, metal, wood, and the like.

Figure 3:
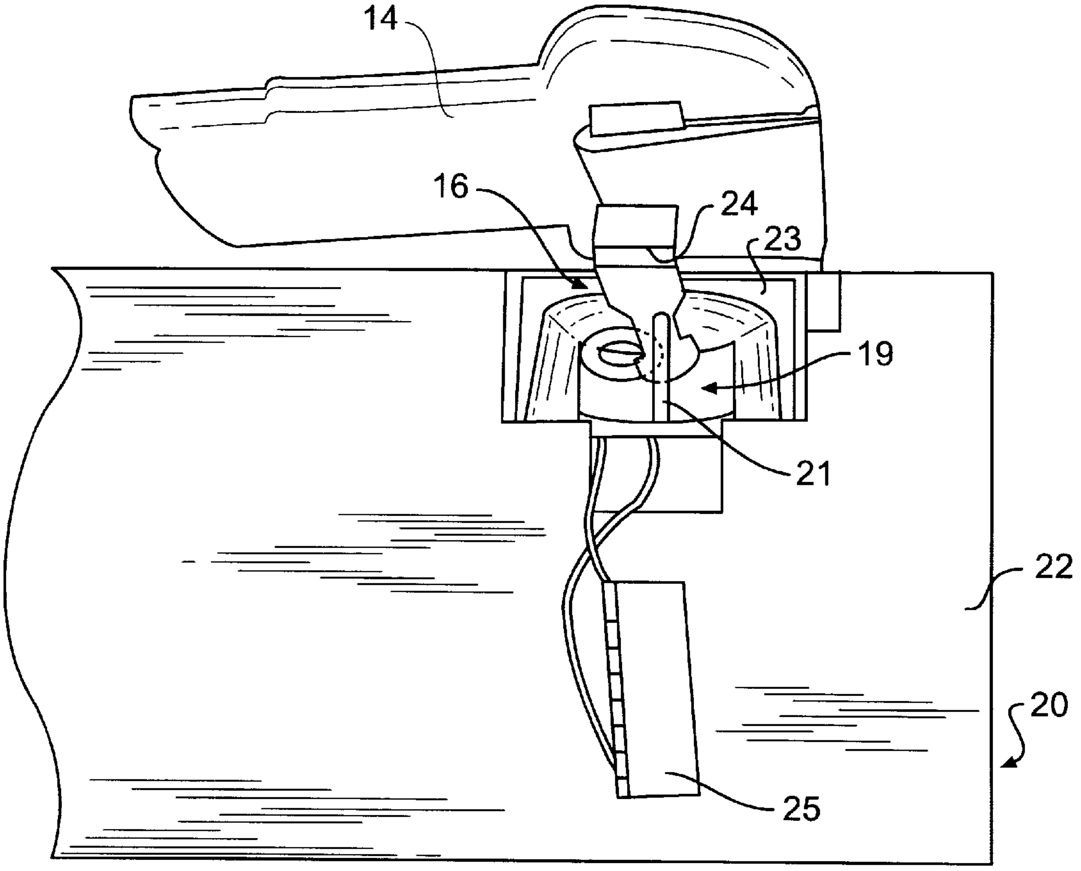
FIG. 3 is a top view of the display illustrated in FIG. 1.

As illustrated in FIG. 3, the first representation 12 is interconnected with the second representation 14 by a mechanical linkage 16. The mechanical linkage 16 interconnects the first representation 12 with the second representation 14 to impart relative motion between the representations 12 and 14. Preferably, the relative motion is oscillatory and pivotal, to simulate toothbrush head flexing. Depending on the design of the display, the flexing concept might also be conveyed with other motions, such as linear movement. Thus, the mechanical linkage 16 may be any device known in the art to provide relative motion between two structures.

In a preferred embodiment, the mechanical linkage 16 includes an electromagnet motor 19 with a driving arm 21. One example of the motor 19 is a self-starting swinging apparatus, such as that described in U.S. Pat. No. 5,483,131, which is herein incorporated by reference in its entirety. The motor 19 may be fixedly mounted in an opening 23 at the top end 22 of the support 20, with the driving arm 21 extending through the opening 23. The second representation 14 is connected to and is driven by the arm 21, by way of a connecting member 24, to move back and forth as indicated by arrows A, B in FIG. 1.

In a preferred embodiment, a solar cell 25 may be electrically connected to the motor 19 in order to power the motor 19. However, the motor 19 can be operated with any other source of power, such as a battery, an alternating current, a spring, and the like. The invention in its broadest sense is not limited by the type of mechanical linkage 16 or the source of power.

The display 10 also preferably includes a third representation 18 of at least a portion of a toothbrush handle. The third representation 18 extends from the first representation 12 in a direction away from the second representation 14. The third representation 18 may depict a straight toothbrush handle, a curved toothbrush handle, a flexible toothbrush handle, or the like. Like the first and second representations, the third representation 18 may be constructed from one or more structural materials that will maintain its form, such as cardboard, plastic, metal, wood, and the like. In a preferred embodiment of the invention, as shown in FIG. 3, the third representation 18 depicts a flexible toothbrush handle.

Further, the display 10 includes an in-store type support 20 for holding and displaying toothbrushes to be sold. The support 20 can be free-standing, or wall-mounted. Alternatively, the display of the invention may be a billboard. The support 20, may include holders such as pegs or shelves 30, for displaying a plurality of toothbrushes (not shown). As illustrated in FIG. 3, the first and third representations (i.e., the handle and a portion of the bristled head) are integrally joined to the support 20, while the second representation (i.e., the flexing tip) is movable with respect to the support 20. However, the invention in its broadest sense is not so limited. In alternate embodiments (not shown) the tip end may remain fixed. Alternately, the invention may be used to display flexible toothbrushes where the entire head flexes relative to the handle.

The embodiment of the invention illustrated in FIGS. 1–3 effectively catches the attention of consumers by providing a motion display for a bristled toothbrush head. In addition, the invention actively demonstrates how the actual toothbrush works by providing the relative motion between the first representation of the first bristled portion of the toothbrush head and the second representation of the second bristled portion of the toothbrush head. The range of movement demonstrated by the motion display also identifies a point of distinction with competing products and conveys advantages of the displayed product.

The motion imparted by the mechanical linkage does not necessarily need to precisely indicate actual motion of the product displayed. Rather, it may simply provide a general suggestion or an exaggeration of the actual motion in order to quickly identify to the user the point of distinction. In its broadest sense, all simulated motions are considered part of the invention.

While one embodiment of the invention has been described as having first and second representations 12 and 14 each depicting a single segment of a toothbrush head, the invention, in its broadest sense, is not so limited. Rather, one or more of the first and second representations may depict multiple segments of a toothbrush head. In this alternative embodiment (not illustrated), the multiple segments depicted in a single representation may be fixedly connected to each other or may be movably connected to each other via a mechanical linkage. In this way, the invention may be used to advertise toothbrushes having more than two head segments.

Therefore, while the invention has been described with specific embodiments thereof, it is evident that many alternatives, modifications, and variations will be apparent to those skilled in the art. Accordingly, the preferred embodiments of the invention as set forth herein is intended to be illustrative, not limiting. Various changes may be made without departing from the spirit and scope of the invention.

What is claimed is:

1. An in-store, promotional display for a flexible head toothbrush, the display comprising:

a support including a plurality of holders, each of the holders configured to hold a plurality of toothbrushes for sale;

a first representation of a first bristled portion of a toothbrush head;

a second representation of a second bristled portion of the toothbrush head, the first representation and the second representation depicting at least a portion of one of the toothbrushes for sale, at least one of the first representation and the second representation being on the support; and a mechanical linkage interconnecting the first representation and the second representation, the mechanical linkage imparting relative motion between the first representation and the second representation to thereby suggest to a store customer how the head of the toothbrushes for sale flexes during use and to identify at least one point of distinction between the toothbrushes for sale and conventional toothbrushes.

2. A display according to claim 1, wherein the mechanical linkage moves the second representation in an oscillatory pivotal path with respect to the first representation.

3. A display according to claim 1, wherein the second representation depicts a tip end of the toothbrush head, and the first representation depicts at least a portion of a remainder of the toothbrush head.

4. A display according to claim 1, further comprising a third representation of at least a portion of a toothbrush handle, the third representation extending from the first representation.

5. A display according to claim 1, wherein the mechanical linkage includes a motor.

6. A display according to claim 5, wherein the motor is capable of producing oscillatory pivotal motion of the second representation with respect to the first representation.

7. A display according to claim 6, wherein the motor is an electromagnet motor.

8. A display according to claim 1, further including a solar cell for powering the mechanical linkage.

9. An in-store, promotional display for a flexible head toothbrush, the display comprising:

a support including a plurality of holders, each of the holders configured to hold a plurality of toothbrushes for sale;

a first representation of a first bristled portion of a toothbrush head;

a second representation of a second bristled portion of the toothbrush head, the first representation and the second representation depicting at least a portion of one of the toothbrushes for sale; and a mechanical linkage interconnecting the first representation with the second representation, wherein the mechanical linkage is configured to impart oscillatory pivotal motion to the second representation relative to the first representation to thereby suggest to a store customer how the head of the toothbrushes for sale flexes during use and to identify at least one point of distinction between the toothbrushes for sale and conventional toothbrushes.

10. A display according to claim 9, wherein the mechanical linkage includes a motor.

11. An in-store, promotional display for a flexible head toothbrush, the display comprising:

a support including a plurality of holders, each of the holders configured to hold a plurality of toothbrushes for sale;

a first representation of a first bristled portion of a toothbrush head;

a second representation of a second bristled portion of the toothbrush head, the first representation and the second representation depicting at least a portion of one of the toothbrushes for sale, the second representation mechanically interconnected with the first representation in a manner permitting the second representation to oscillate pivotally with respect to the first representation to thereby suggest to a store customer how the head of the toothbrushes for sale flexes during use and to identify at least one point of distinction between the toothbrushes for sale and conventional toothbrushes.

12. A display according to claim 11, further including a motor mechanically interconnecting the first and second representations.

13. A promotional display for a flexible toothbrush for sale, the display comprising:

a representation of a flexible portion of a toothbrush;

a support for the representation, the support including a plurality of holders, each of the holders configured to hold a plurality of toothbrushes for sale; and a mechanical linkage interconnecting the representation with the support, the mechanical linkage configured to impart motion to the representation and to thereby suggest to a viewer how the toothbrush for sale flexes during use and a identify at least one point of distinction between the toothbrush for sale and conventional toothbrushes.

14. A display according to claim 13, wherein the representation is of a tip end of a toothbrush head and wherein the support includes a representation of another portion of the toothbrush head.

15. A display according to claim 13, wherein the representation includes at least a portion of a toothbrush head and wherein the support includes a representation of at least a portion of a toothbrush handle.

16. An in-store promotional display for a flexible head toothbrush, the display comprising:

a first representation of a first bristled portion of a toothbrush head;

a second representation of a second bristled portion of the toothbrush head, the first representation and the second representation depicting at least a portion of a toothbrush for sale in the store;

a mechanical linkage interconnecting the first representation and the second representation, the mechanical linkage imparting relative motion between the first representation and the second representation to thereby suggest to a store customer how the head of the toothbrush for sale flexes during use and to identify at least one point of distinction between the toothbrush for sale and conventional toothbrushes; and a solar cell for powering the mechanical linkage.

17. An in-store promotional display for a flexible head toothbrush for sale, the display comprising:

a support configured to hold a plurality of flexible head toothbrushes for sale;

first representation of a first bristled portion of a toothbrush head provided on the support;

a mechanical linkage extending from the support; and a second representation of a second bristled portion of the toothbrush head provided on the mechanical linkage, the first representation and the second representation depicting at least a portion of the flexible head toothbrushes for sale, the mechanical linkage imparting relative motion between the first representation and the second representation to thereby suggest how the head of the flexible head toothbrushes for sale flexes during use and to identify a point of distinction between the flexible head toothbrushes for sale and conventional toothbrushes.

18. An in-store promotional display for a flexible head toothbrush for sale, the display comprising:

a support configured to hold a plurality of flexible head toothbrushes for sale;

a first representation of a first bristled portion of a toothbrush head provided on the support;

a mechanical linkage extending from the support; and a second representation of a second bristled portion of the toothbrush head provided on the mechanical linkage, the first representation and the second representation depicting at least a portion of the flexible head toothbrushes for sale, wherein the mechanical linkage is configured to impart oscillatory pivotal motion to the second representation relative to the first representation to thereby suggest how the head of the flexible head toothbrushes for sale flexes during use and to identify a point of distinction between the flexible head toothbrushes for sale and conventional toothbrushes.

19. A method for advertising a flexible head toothbrush for sale, comprising:

providing an advertising apparatus having a first representation of a first bristled portion of a toothbrush head, a second representation of a second portion of a toothbrush, and a mechanical linkage interconnecting the first and second representations, the first and second representations being of sizes larger than corresponding portions of the toothbrush for sale;

providing a support, at least one of the first representation and the second representation being on the support;

maintaining the advertising apparatus in a store; and moving the mechanical linkage, in the store, to impart relative motion between the first and second representations to thereby suggest to customers in the store how a head of the advertised flexible head toothbrush moves during use, and to identify to customers at least one point of distinction between the toothbrush for sale and conventional toothbrushes.

20. A method for advertising a flexible head toothbrush for sale, comprising:

providing an advertising apparatus having a first representation of a first bristled portion of a toothbrush head, a second representation of a second portion of a toothbrush, and a mechanical linkage interconnecting the first and second representations, the first and second representations being of sizes larger than corresponding portions of the toothbrush for sale;

providing a support, at least one of the first representation and the second representation being on the support;

maintaining the advertising apparatus in a location visible to potential customers; and moving the mechanical linkage, at said location, to impart relative motion between the first and second representations to thereby suggest to customers at said location how a head of the advertised flexible head toothbrush moves during use, and to identify to customers at least one point of distinction between the toothbrush for sale and conventional toothbrushes.

* * * * *